US012591653B2

(12) United States Patent
Mehtani

(10) Patent No.: US 12,591,653 B2
(45) Date of Patent: Mar. 31, 2026

(54) AUTHENTICATION USING AI-GENERATED MEDIA SAMPLES

(71) Applicant: MASTERCARD INTERNATIONAL INCORPORATED, Purchase, NY (US)

(72) Inventor: Lalit Mehtani, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 69 days.

(21) Appl. No.: 18/614,594

(22) Filed: Mar. 22, 2024

(65) Prior Publication Data

US 2025/0298883 A1     Sep. 25, 2025

(51) Int. Cl.
*G06F 21/36* (2013.01)
*G06F 3/04842* (2022.01)

(52) U.S. Cl.
CPC .......... *G06F 21/36* (2013.01); *G06F 3/04842* (2013.01)

(58) Field of Classification Search
CPC .............................. G06F 21/36; G06F 3/04842
See application file for complete search history.

(56) References Cited

U.S. PATENT DOCUMENTS 9,129,101 B2     9/2015  Headley et al.
2021/0264520 A1*  8/2021  Cummings ............ G06Q 40/12

| 2022/0353258 | A1 | 11/2022 | Ortiz et al. | |
| 2023/0114650 | A1 | 4/2023 | Keith, Jr. | |
| 2024/0354503 | A1* | 10/2024 | Baruch | G06F 16/345 |
| 2025/0068737 | A1* | 2/2025 | Keith, Jr. | G06F 21/566 |
| 2025/0156122 | A1* | 5/2025 | Yu | G06F 9/5077 |
| 2025/0165893 | A1* | 5/2025 | Silcock | G06F 3/0484 |
| 2025/0191558 | A1* | 6/2025 | Silverstein | G10H 1/0091 |

OTHER PUBLICATIONS

Ogbuokiri et al., "Visual Password Scheme Using Bag Context Shape Grammars" Advances in Intelligent Systems and Computing 1181:13, 2021, 13 pages.
Iffath et al., "RAIF: A deep learning-based architecture for multi-modal aesthetic biometric system" Computer Animation & Virtual Worlds 34(3-4):11 Apr. 12, 2023, 11 pages.

(Continued)

*Primary Examiner* — Kristie D Shingles
(74) *Attorney, Agent, or Firm* — Barta Jones, PLLC

(57) ABSTRACT

A computerized method performs an authentication process using AI-generated media samples. A login request is received from a user, and, in response to the login request, a preferred sample metadata value associated with the user is obtained. The preferred sample metadata value is associated with a sample category. Using the preferred sample metadata value, a generative AI model is used to generate a preferred sample of the sample category. Further, the model is used to generate other samples of the sample category. The other samples do not include samples generated from the preferred sample metadata value. The generated preferred sample and the other samples are provided to the user via an interface and the user is prompted to select a preferred sample from the provided samples. When the user response to the prompt matches the provided preferred sample, the login request is granted to the user.

20 Claims, 7 Drawing Sheets

600

(56) References Cited

OTHER PUBLICATIONS

Sieu et al., "Biometric Identification from Human Aesthetic Preferences" Sensors:19, Feb. 19, 2020, 19 pages.

Gavrilova et al., "Emerging Trends in Security System Design Using the Concept of Social Behavioural Biometrics" Information Fusion for Cyber-Security Analytics, Studies in Computational Intelligence:23, copyright 2017, 23 pages.

* cited by examiner

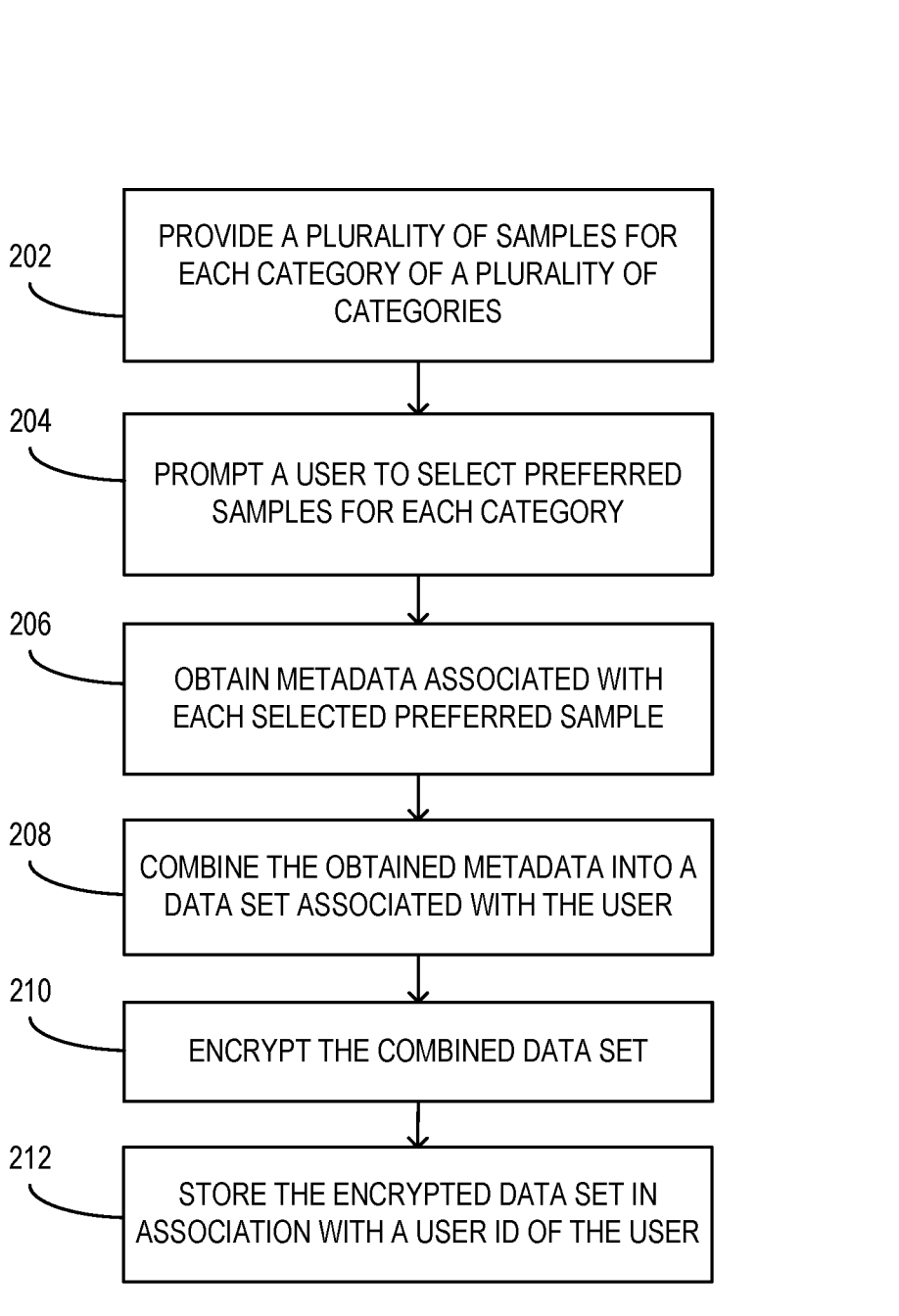

200

202 — PROVIDE A PLURALITY OF SAMPLES FOR EACH CATEGORY OF A PLURALITY OF CATEGORIES

204 — PROMPT A USER TO SELECT PREFERRED SAMPLES FOR EACH CATEGORY

206 — OBTAIN METADATA ASSOCIATED WITH EACH SELECTED PREFERRED SAMPLE

208 — COMBINE THE OBTAINED METADATA INTO A DATA SET ASSOCIATED WITH THE USER

210 — ENCRYPT THE COMBINED DATA SET

212 — STORE THE ENCRYPTED DATA SET IN ASSOCIATION WITH A USER ID OF THE USER

FIG. 2

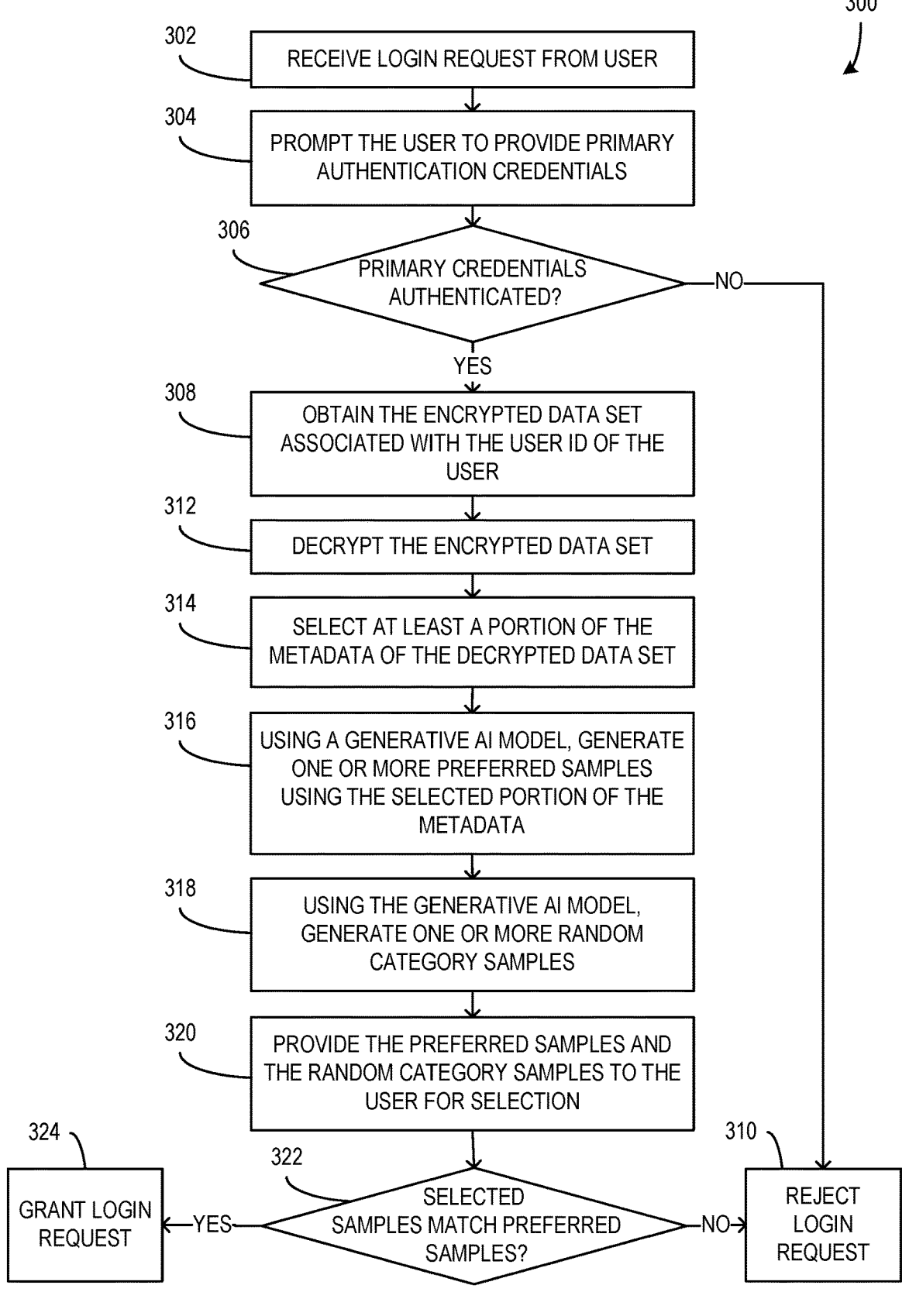

300

302 — RECEIVE LOGIN REQUEST FROM USER

304 — PROMPT THE USER TO PROVIDE PRIMARY AUTHENTICATION CREDENTIALS

306 — PRIMARY CREDENTIALS AUTHENTICATED?

NO

YES

308 — OBTAIN THE ENCRYPTED DATA SET ASSOCIATED WITH THE USER ID OF THE USER

312 — DECRYPT THE ENCRYPTED DATA SET

314 — SELECT AT LEAST A PORTION OF THE METADATA OF THE DECRYPTED DATA SET

316 — USING A GENERATIVE AI MODEL, GENERATE ONE OR MORE PREFERRED SAMPLES USING THE SELECTED PORTION OF THE METADATA

318 — USING THE GENERATIVE AI MODEL, GENERATE ONE OR MORE RANDOM CATEGORY SAMPLES

320 — PROVIDE THE PREFERRED SAMPLES AND THE RANDOM CATEGORY SAMPLES TO THE USER FOR SELECTION

324 — GRANT LOGIN REQUEST

322 — SELECTED SAMPLES MATCH PREFERRED SAMPLES?

YES

NO

310 — REJECT LOGIN REQUEST

AUTHENTICATION USING AI-GENERATED MEDIA SAMPLES

BACKGROUND

Multi-factor authentication (MFA) has become increasingly popular and necessary to protect information and prevent malicious actors from accessing online accounts. A user is prompted to provide primary credentials such as a username and password, and then the user is prompted to perform another task or provide another piece of information to complete the authentication process. In many cases, such secondary authentication includes answering a personal question or the like. However, answers to such questions must be remembered by the user and may be guessed by a malicious actor trying to gain access. Determining secondary authentication tasks that are easy for the user to complete but difficult for others to guess presents significant technical challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for performing an authentication process using artificial intelligence (AI)-generated media samples is described. A login request is received from a user, and, in response to the login request, a preferred sample metadata value associated with the user is obtained. The preferred sample metadata value is associated with a particular sample category. Using the preferred sample metadata value, a generative AI model is used to generate a preferred media sample of the sample category. Further, the generative AI model is used to generate a set of other samples of the sample category. The set of other samples does not include samples generated from the preferred sample metadata value. The generated preferred sample and the other samples are provided to the user via an interface and the user is prompted to select a preferred sample from the provided samples. When the user response to the prompt matches the provided preferred sample, the login request is granted to the user. Alternatively, when the user response to the prompt does not match the provided preferred sample, the login request is rejected.

BRIEF DESCRIPTION OF THE DRAWINGS

The present description will be better understood from the following detailed description read considering the accompanying drawings, wherein:

FIG. 2 is a flowchart illustrating an example method for collecting preferred media samples from a user;

FIG. 3 is a flowchart illustrating an example method for performing secondary authentication using AI-generated samples based on user selections;

Corresponding reference characters indicate corresponding parts throughout the drawings. In FIGS. 1 to 7, the systems are illustrated as schematic drawings. The drawings may not be to scale. Any of the figures may be combined into a single example or embodiment.

DETAILED DESCRIPTION

Figure 1:
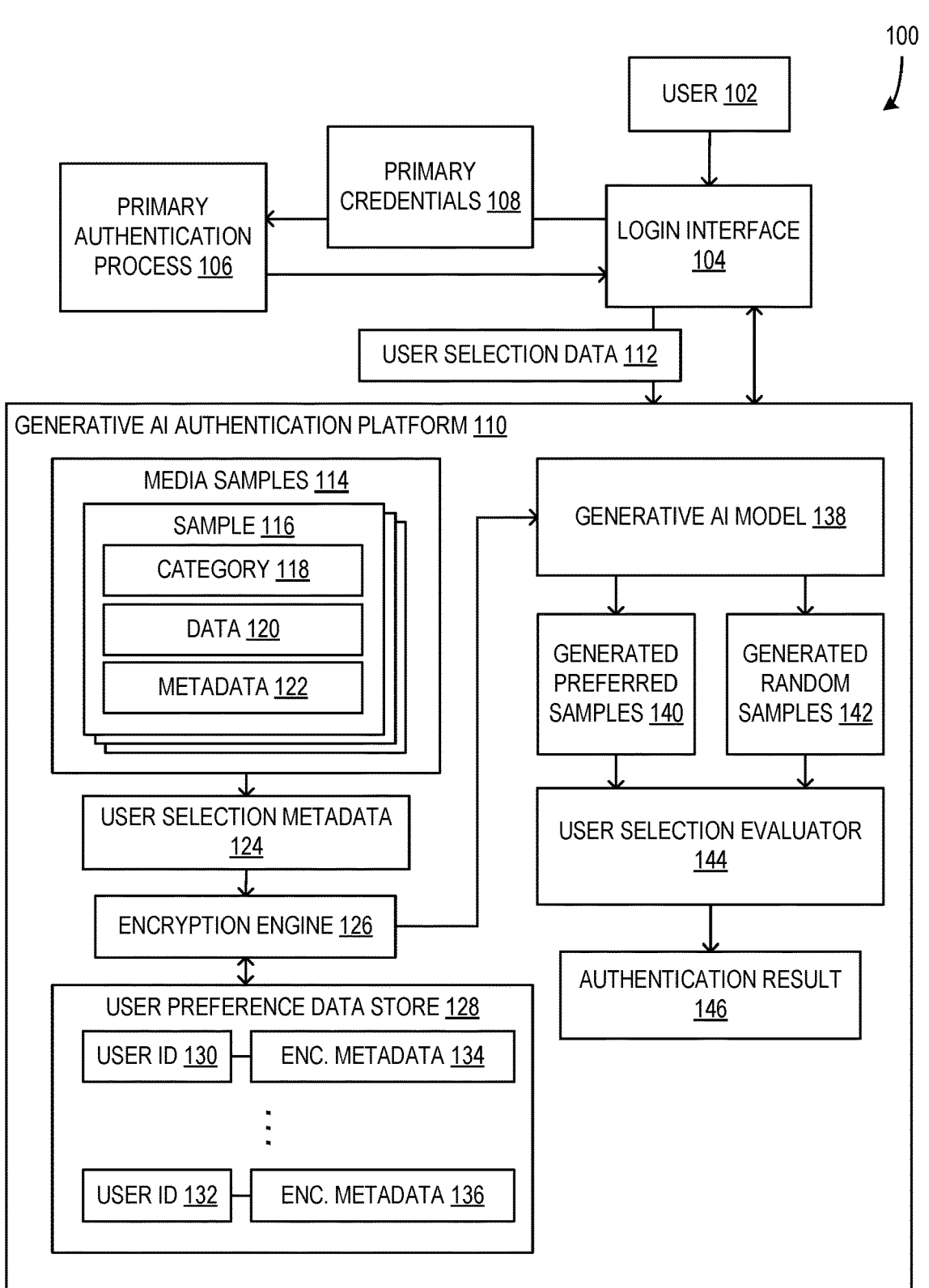
FIG. 1 is a block diagram illustrating an example system for performing secondary authentication using AI-generated samples based on user selections.

Aspects of the disclosure provide systems and methods for performing authentication of users or other entities using artificial intelligence (AI)-generated media samples. In some examples, a user is presented a plurality of media samples of a plurality of categories, such as nature images, architecture images, and/or music audio samples. The user is prompted to select a preferred media sample from each of the plurality of categories. The user's selected preferences are stored in a user preference data store in the form of metadata values that include descriptive information of the media samples the user selected. In some such examples, the user preferences are encrypted for storage.

Later, when the user attempts to log in to a secured website or other entity, the user's stored preferences are accessed, including decryption if necessary. The metadata values that are descriptive of the user's preferences are provided to a trained generative AI model, which uses the metadata values to generate new preferred media samples that match the categories of the metadata values and that include content that matches the descriptive information of the metadata values. Additionally, the generative AI model is used to generate a plurality of other media samples that match the same categories as the generated preferred media samples but that are generated based on metadata values other than those associated with the user's preferences. All of the generated media samples are presented to the user and the user is prompted to select their preferred sample or samples. The user's response is compared to the generated preferred media samples and, if they match, the user is authenticated. Alternatively, if the user's response and the generated preferred media samples do not match, the user is not authenticated.

The disclosure operates in an unconventional manner at least by using newly AI-generated media samples that a user can identify as a preferred sample during authentication. During the initial configuration, the user is prompted to select samples based on their preferences, which are likely to be easily remembered by the user later. The newly AI-generated media samples then reflect the user's preferences, enabling the user to evaluate the presented samples during authentication using their preferences, rather than remembering specific pieces of information. Thus, the disclosure enables users to perform the associated authentication tasks more easily and in a more technically efficient way.

Further, the security of the disclosed authentication processes is enhanced. Because the presented media samples are newly generated and do not exactly match any previously presented media samples in appearance, patterns in user selection behavior are much more difficult to identify for malicious actors that may somehow observe a user performing an authentication task. Additionally, in examples of the disclosure where media samples that combine multiple categories are displayed, guessing of the correct sample by a malicious actor becomes significantly more difficult as well.

The disclosure further enables the efficient use of data storage resources with respect to storing users' preference information for later use during authentication. In other systems where users select images or other media samples that must be exactly replicated during authentication, those selected media samples must be stored in their entirety in the system. However, the disclosure only requires storing sets of metadata values that can later be used to generate media samples as described herein. Those sets of metadata value occupy significantly less data storage space than associated media samples.

FIG. 1 is a block diagram illustrating a system 100 for performing secondary authentication using AI-generated samples 140 based on user selections 112. In some examples, the system 100 includes a user 102 using a login interface 104 to log in to a secured platform. During the login process, the user 102 navigates a primary authentication process 106 and then a secondary authentication process via a generative AI authentication (GAA) platform 110 (e.g., during Multi-Factor Authentication (MFA)).

Further, in some examples, the system 100 includes one or more computing devices (e.g., the computing apparatus of FIG. 7) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the GAA platform 110 is executed on a first computing device and the login interface 104 is located on a second computing device within the system 100. The first computing device and second computing device are configured to communicate with each other via network connections. Alternatively, in some examples, other components of the GAA platform 110 (e.g., the encryption engine 126, the generative AI model 138, the user selection evaluator 144) are executed on separate computing devices and those separate computing devices are configured to communicate with each other via network connections during the operation of the GAA platform 110. In other examples, other organizations of computing devices are used to implement system 100 without departing from the description.

In some examples, the user 102 accesses the login interface 104 using a computing device when trying to log in to a secure website or other platform (e.g., a bank website, a credit card user account platform, or the like). The user 102 is prompted to provide primary credentials 108 to complete the primary authentication process 106. In some such examples, the primary credentials 108 include a username or other identifier of the user 102 and a password. The primary authentication process 106 is configured to authenticate the provided primary credentials 108 using stored user credential data (e.g., encrypted password information). Additionally, or alternatively, in other examples, other types of credentials are used during the primary authentication process 106 without departing from the description. Further, in other examples, the system 100 is configured to use the GAA platform 110 during a primary authentication process 106 instead of during a secondary authentication process without departing from the description.

In some examples, after the primary authentication process 106 is completed and the primary credentials 108 are authenticated, the user interacts with the GAA platform 110 to set up preferences for a secondary authentication process. In some such examples, the user 102 is provided media samples 114 via the login interface 104 and is prompted to select preferred samples from the provided media samples 114. The selections made by the user 102 are provided to the GAA platform 110 in the form of user selection data 112.

It should be understood that, in some examples, a preferred sample or user-preferred sample is a sample that the user 102 has selected and/or a sample 140 generated from metadata values that are obtained from other samples 116 that the user 102 has previously selected.

Further, in some examples, the provided media samples 114 are media instances such as images, audio or sound files, video files or the like. Each sample 116 of the media samples 114 includes a category 118, the data 120 that defines the sample 116 (e.g., the data defining the appearance of an image or the data defining the sounds played in an audio file), and metadata 122 that defines a type of the sample 116 within its category 118. For instance, in an example, a sample 116 is an image with a category of "architecture". The metadata 122 includes data indicating the type of architecture displayed in the sample 116 image (e.g., classical, modern, city, bridge, skyscraper, or the like). In some such examples, the metadata 122 of the sample 116 includes one type indicator (e.g., skyscraper) or a plurality of different type indicators (e.g., modern, skyscraper, evening, lights).

In some examples, the media samples 114 provided to the user 102 via the login interface 104 include samples 116 associated with one or more categories 118 and, for each category 118 with which the provided samples 116 are associated, a plurality of samples 116 with different types in metadata 122 are provided (e.g., several samples associated with a "nature image" category are provided with various types including green, jungle, trees, rain, desert, blue sky, sunny weather, sand, beach, mountains, or the like). The user 102 is prompted to select a single preferred sample 116 for each provided category 118, such that the user selection data 112 includes identifiers of one sample 116 per category 118 and/or metadata 122 associated with the selected samples 116.

Further, the user selection data 112 is used by the GAA platform 110 to obtain user selection metadata 124 from the media samples 114. In some such examples, the GAA platform 110 uses identifiers of samples 116 in the user selection data 112 to obtain the metadata 122 of those samples 116 to form the user selection metadata 124 (e.g., the metadata 122 values are concatenated together into a single data set). Alternatively, or additionally, in some examples, the metadata 122 of the selected samples 116 is in the user selection data 112 and that metadata 122 is used to form the user selection metadata 124.

In some examples, the GAA platform 110 encrypts the user selection metadata 124 using an encryption engine 126 and then stores the encrypted metadata in a user preference data store 128 (e.g., the user ID 130 is stored in association with the encrypted metadata 134 and the user ID 132 is stored in association with the encrypted metadata 136). By storing the encrypted metadata in the user preference data store 128 as described, the GAA platform 110 is enabled to access the encrypted metadata 134-136 from the user preference data store 128 during future authentication processes but the encrypted metadata 134-136 is secured by encryption while it is stored therein. In some such examples, the encryption performed by the encryption engine 126 is Structured Query Language (SQL) server column level encryption and the user preference data store 128 is configured to be compatible with SQL. Alternatively, or additionally, in other examples, other types of encryption are used by the encryption engine 126 without departing from the description.

Further, in some examples, the encryption engine 126 is also configured to decrypt the encrypted metadata 134-136 when it is needed during an authentication process. In some such examples, the user 102 requests to log in via the login interface 104 and successfully passes the primary authentication process 106, such that the secondary authentication process is executed as described herein. The GAA platform 110 identifies the encrypted metadata 134-136 associated with the user 102 based on the user ID 130-132 of the user 102 and decrypts the identified metadata using the encryption engine 126. The decrypted metadata is provided to the generative AI model 138, which then generates preferred samples 140 based on the user 102's previously made selections. Additionally, the generative AI model 138 generates another set of random samples 142.

The generated preferred samples 140 and the generated random samples 142 are displayed or otherwise provided to the user 102 via the login interface 104 and the user 102 is prompted to select a sample from those provided. The user selection is provided back to the GAA platform 110, where it is used by the user selection evaluator 144. In some examples, the user selection evaluator 144 compares the user selection to the generated preferred sample 140 and, if they match, an authentication result 146 indicating that the user 102 is authenticated is generated. Alternatively, if the user selection does not match the generated preferred sample 140 (e.g., the user 102 selected one of the generated random samples 142), an authentication result 146 indicating that the user 102 is not authenticated is generated.

In some examples, the generative AI model 138 is a model that has been trained using machine learning (ML) techniques. The generative AI model 138 is trained using training data such as pairs of samples 116 and their associated metadata 122. Throughout a ML training process, the generative AI model 138 is trained to associated certain types of samples and/or features of those samples with certain metadata 122 values (e.g., a metadata value of "desert" becomes associated with image features that are common among pictures of deserts, such as the color palette of sand, the common shapes of sand dunes, or the like). After sufficient training, the generative AI model 138 is configured to receive one or more metadata 122 values (e.g., the user selection metadata 124) and, in response, to generate preferred samples 140 that reflect those metadata 122 values. For instance, in an example where the input metadata 122 values include the value of "desert", the generated preferred sample 140 is an image that includes colors, shapes, or other image features that have become associated with "desert".

Further, in some examples, the generative AI model 138 is trained to generate combined samples, such that multiple metadata 122 values are provided to the generative AI model 138 as input and the generative AI model 138 generates preferred samples 140 that include features of each of the input multiple metadata 122 values. For instance, in an example, the input metadata 122 values include "sports car" and "mountains". The generative AI model 138 then generates an image of a sports car driving through mountain scenery.

Additionally, or alternatively, in some examples, the generative AI model 138 includes multiple models trained to generate various kinds of samples. For instance, in some examples, the generative AI model 138 includes a model for generating images from metadata 122 values and a model for generating audio samples from metadata 122 values. In other examples, more or different models are used to generate different types of samples without departing from the description, such as a model that is trained to generate video samples.

In some examples, multiple preferred samples 140 are generated and then combined into a combined sample and provided to the user 102. For instance, in an example, the user 102 has a preferred nature image type of "forest" and a preferred music type of "jazz". The generative AI model 138 generates a preferred sample image of a forest and a preferred audio sample of jazz music. Those two preferred samples are combined, such that when the user 102 observes the sample image, the jazz music sample is played for the user (e.g., the user is prompted to activate a play button under the sample image). Further, in such examples, the generative AI model 138 generates similar combined samples from the generated random samples 142, such that each combined sample is a combination of the same types of samples (e.g., all the combined samples are an image paired with an audio sample).

It should be understood that, in some examples, the generation of the random samples 142 includes identifying the preferred metadata values of the user in the user selection metadata 124 and then avoiding the use of those metadata values when generating the random samples 142. Thus, the generated random samples 142 do not include a sample that matches the user 102's preferences through random chance of picking metadata values that the user 102 prefers.

In some examples, the authentication result 146 generated by the user selection evaluator 144 is provided to the login interface 104. Based on the authentication result 146, the login interface 104 or an associated process or entity determines whether the user 102 is authenticated. In some such examples, if the authentication result 146 indicates that the user 102 has been authenticated with respect to the GAA platform 110, the user is considered to be authenticated for the overall MFA process being performed. Alternatively, if the authentication result 146 indicates that the user has not been authenticated with respect to the GAA platform 110, the user is not considered authenticated for the overall MFA process being performed. In some examples, such as situations where the user 102 is trying to log into a secure website, if the user is authenticated as described herein, the user 102 is redirected to the secure website and, if the user is not authenticated as described herein, the user 102 is redirected to a web page that notifies the user that authentication has failed.

In some examples, the media samples 114 and/or the generated random samples 142 are generated using a Large Language Model (LLM) or other similar text-based ML model. In some such examples, the text-based ML model is prompted to generate text that includes metadata values (e.g., metadata 122) associated with one or more categories 118 for which the samples are being generated. For instance, the text-based ML model is prompted to generate text prompts based on historical and/or moder architecture with different weather conditions or different music beats. The text-based ML model then generates prompts that include metadata values, such as "leaning tower of Pisa in rainy weather", "Buckingham Palace on a hot afternoon", "Snowy night at Las Vegas sphere", "Drum and bass beats with intense percussions", and/or "Grand orchestral arrangement". The generative AI model 138 is then provided these generated text prompts as input to generate media samples, such as the media samples 114 and/or the generated random samples 142, as described herein.

Further, in some such examples, the generation of audio samples based on prompts uses an autoregressive language model.

Additionally, or alternatively, in some examples, the generative AI model 138 includes diffusion models for generation of image samples. Diffusion models are trained with vast datasets consisting of millions of images, each accompanied by textual descriptions, to grasp the correlation between text and images. Along the way, the model network learns additional conceptual information about the world, like what colors or elements would make an image feel like it was created by a specific media creating entity. Once trained, these models adeptly interpret user-provided text prompts to generate a preliminary low-resolution image, progressively refining it by incrementally incorporating finer details. The iterative process continues until the model produces the final high-resolution image, leveraging its extensive learning iterations. Diffusion models generate everything from scratch, without reference to any images found elsewhere. If prompted to generate an image of a dog, the diffusion model does not find an image of a dog and add details to it. Instead, the diffusion model creates the image of a dog from scratch, based on its learned understanding of what a dog is.

It should be understood that, in some examples, the system 100 is configured to enable multiple methods of operation, including a method for collecting preferred media samples from a user for future use during a login (e.g., the method 200 of FIG. 2 as described below) and a method for enabling a user to log in using defined media preferences (e.g., the methods 300 and 400 of FIGS. 3 and 4, respectively, as described below). Thus, all of the functionality of the system 100 described herein is not necessarily used during particular methods of operation.

FIG. 2 is a flowchart illustrating a method 200 for collecting preferred media samples from a user. In some examples, the method 200 is executed or otherwise performed by or in association with a system such as system 100 of FIG. 1.

At 202, a plurality of samples is provided for each category of a plurality of categories. In some examples, the plurality of samples is displayed to the user via an interface, such as a Graphical User Interface (GUI) (e.g., the user 102 using the login interface 104). Further, in some such examples, the plurality of samples includes sample images from various categories (e.g., nature, architecture, cars, abstract patterns), audio samples from different categories (rock music, jazz, disco, hip hop, specific instrument sounds), video samples from different categories, or the like. For instance, in an example, a first group of images of nature scenes are displayed, a second group of images of cars are displayed, a third group of images of architecture are displayed, and a fourth group of icons associated with audio samples are displayed, wherein activating each icon causes the associated audio sample to play for the user.

At 204, the user is prompted to select preferred samples for each category. In some examples, the user is enabled to activate one sample of each category using the GUI on which the samples are displayed or otherwise provided (e.g., the user checks a box next to each preferred sample in each category, wherein the user is prevented from checking multiple boxes in a single category).

At 206, metadata associated with each selected preferred sample is obtained. In some examples, the file name or ID of each selected preferred sample is used to access metadata associated with those samples from a data store (e.g., the IDs of selected samples 116 are used with the media samples 114 of the GAA platform 110 to obtain the metadata 122 from those samples 116).

At 208, the obtained metadata is combined into a data set (e.g., the user selection metadata 124) associated with the user and, at 210, the combined data set is encrypted (e.g., the user selection metadata 124 is encrypted using the encryption engine 126).

At 212, the encrypted data set is stored in associated with a user ID of the user (e.g., the encrypted metadata 134 is stored in association with the user ID 130 in the user preference data store 128). Thus, the user's preferences for different types of media samples can be used during authentication processes such as MFA processes as described herein.

FIG. 3 is a flowchart illustrating a method 300 for performing secondary authentication using AI-generated samples 140 based on user selections 112. In some examples, the method 300 is executed or otherwise performed by or in association with a system such as system 100 of FIG. 1.

At 302, a login request is received from a user (e.g., user 102) and, at 304, the user is prompted to provide primary authentication credentials (e.g., primary credentials 108). In some examples, the user uses a login interface (e.g., login interface 104) to make the login request and the prompt is displayed or otherwise provided to the user via that interface. Further, in some examples, the primary authentication credentials include a username and password associated with the user.

At 306, if the primary credentials are authenticated, the process proceeds to 308. Alternatively, if the primary credentials are not authenticated, the process proceeds to 310. In some examples, the authentication of the primary credentials is performed by a primary authentication process (e.g., primary authentication process 106) as described herein.

At 308, an encrypted data set (e.g., encrypted metadata 134) associated with the user ID (e.g., user ID 130) of the user is obtained. In some examples, the encrypted data set is obtained from a user preference data store 128, in which the encrypted data set is stored in association with the user's user ID (e.g., the user's username or other similar identifier).

Alternatively, at 310, the user's login request is rejected due to the authentication of the primary credentials failing. In some examples, the user is notified that the login request has failed and/or information is provided to the user explaining the reason for the login request failure.

At 312, the encrypted data set is decrypted. In some examples, the decrypted data set includes a set of metadata values (e.g., user selection metadata 124) that are associated with the selections made by the user when initially configuring their sample preferences as described above with respect to FIGS. 1 and 2.

At 314, at least a portion of the metadata of the decrypted data set is selected and, at 316, using a generative AI model (e.g., generative AI model 138), one or more preferred samples are generated using the selected portion of the metadata. In some examples, the selected portion of the metadata includes a first metadata value associated with a first sample category and a second metadata value associated with a second sample category. The generative AI model generates a first preferred sample associated with the first sample category using the first metadata value and a second preferred sample associated with the second sample category using the second metadata value. Additionally, or alternatively, in some examples, the generative AI model generates a single preferred sample that is associated with the first and second sample categories based on the first and second metadata values, wherein the single preferred sample is a combined sample (e.g., a sample image that includes both a car and architecture based on the user's preference selections with respect to a car category and an architecture category). In other examples, more, fewer, and/or different metadata values are selected from the decrypted data set and more, fewer, and/or different preferred samples are generated based on those selected metadata values without departing from the description.

At 318, the generative AI model is further used to generate one or more random category samples. In some examples, generating the one or more random category samples includes randomly selecting a plurality of metadata values associated with one or more sample categories and using the randomly selected plurality of metadata values as input to the generative AI model. The generative AI model then generates a sample for each of the input metadata values. Additionally, or alternatively, the generated random samples (e.g., generated random samples 142) include combined samples in the same way that the preferred samples 140 include combined samples as described above. For instance, in an example, the preferred sample is a combined sample that includes an image of a particular type of nature scene and an audio sample of a particular genre of music. Then, the generative AI model is used to generate multiple random samples, wherein each of the random samples includes an image of a nature scene and an audio sample of a genre of music.

Further, in some examples, the generation of the random samples using the generative AI model includes filtering out the user selection metadata values from the metadata values used to generate the random samples. Thus, the generated random samples are not based on any of the user's preferred metadata values, avoiding confusion of the user.

At 320, the preferred samples and the random samples are provided to the user for selection as part of the secondary authentication process. In some examples, the samples are displayed for selection on a GUI to the user. Alternatively, or additionally, audio samples are played for the user based on the user interacting with the interface (e.g., activating a button in a GUI).

At 322, if the selected samples match the preferred samples, the process proceeds to 324 where the login request is granted. Alternatively, if the selected samples do not match the preferred samples, the process proceeds to 310 where the login request is rejected, as described above. In some examples, the selections made by the user from among the preferred samples and the random samples are provided for evaluation by a user selection evaluator 144 as described herein. Thus, in some such examples, the login interface being used by the user does not have access to the information indicating which of the samples are the correct sample. Rather, the evaluation of the selections is performed in another entity, such as a GAA platform 110.

At 324, the login request is granted. In some examples, an indicator of the successful authentication of the user is provided to the interface being used by the user and the interface is caused to proceed to the secured website or other secured entity to which the user is logging in. In other examples, the interface performs other actions as a result of the login request being granted without departing from the description.

Figure 4:
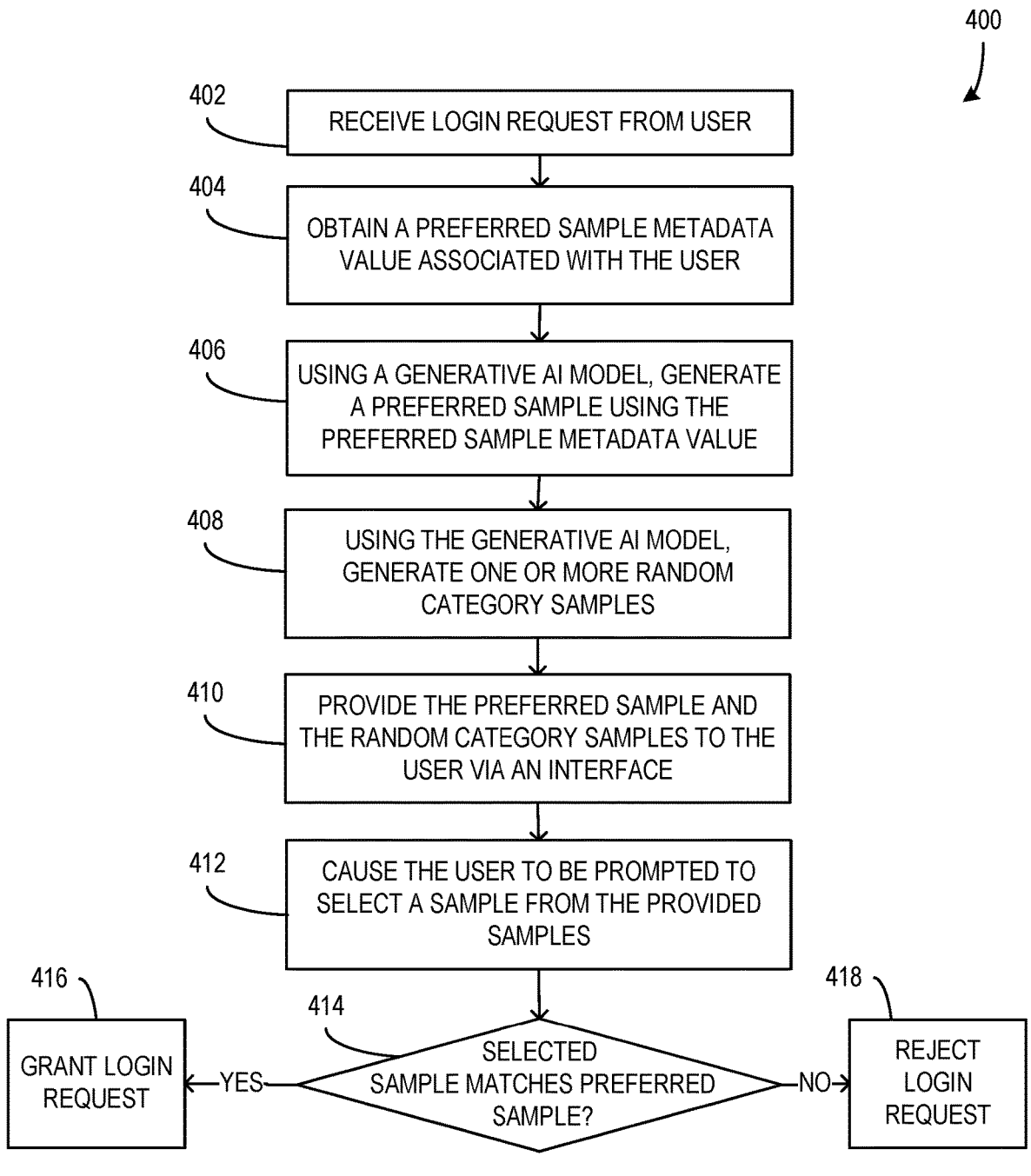
FIG. 4 is a flowchart illustrating an example method for performing user authentication using an AI-generated sample based on a user-selected sample.

FIG. 4 is a flowchart illustrating a method 400 for performing user authentication using an AI-generated sample based on a user-selected sample. In some examples, the method 400 is executed or otherwise performed by or in association with a system such as system 100 of FIG. 1. Further, in some examples, the method 400 further includes processes and/or other details described above with respect to methods 200 and 300 of FIGS. 2 and 3, respectively, without departing from the description.

At 402, a login request is received from a user and, at 404, a preferred sample metadata value associated with the user is obtained. In some examples, a user ID of the user is used to access a stored preferred sample metadata value from a user preference data store 128. Further, in some examples, obtaining the preferred sample metadata value includes obtaining encrypted metadata (e.g., encrypted metadata 134) and decrypting it to obtain the preferred sample metadata value.

At 406, a generative AI model (e.g., the generative AI model 138) is used to generate a preferred sample using the preferred sample metadata value and, at 408, the generative AI model is used to generate one or more random category samples, wherein the random category samples are of the same category as the preferred sample.

At 410, the preferred sample and the one or more random category samples are provided to the user via an interface and, at 412, the method 400 causes the user to be prompted to select a sample from the provided samples.

At 414, if the selected sample matches the preferred sample, the process proceeds to 416 and the login request is granted. Alternatively, if the selected sample does not match the preferred sample, the process proceeds to 418 and the login request is rejected.

In some examples, the method 400 is performed as at least one of a primary authentication process or a secondary authentication process (e.g., as part of an MFA process).

Further, in some examples, obtaining the preferred sample metadata value includes obtaining a first preferred sample metadata value associated with a first sample category and obtaining a second preferred sample metadata value associated with a second sample category. Generating the preferred sample further includes generating a combined sample of the first category and the second category using the first preferred sample metadata value and the second preferred sample metadata value.

In some such examples, the combined sample includes a generated image and a generated audio sample, wherein the generated audio sample is configured to be playable by the user through interaction with the combined sample via the interface. Alternatively, or additionally, the combined sample includes an image with image content associated with the first sample category and image content associated with the second sample category (e.g., an image that includes a car associated with the first sample category driving through nature scenery associated with the second sample category).

Additionally, or alternatively, in some examples, the method 400 includes causing the preferred sample and the one or more random samples to be displayed to the user on a GUI. The user is enabled to interact with the GUI to select at least one of the preferred sample and the one or more random samples. Upon detecting the selection of one of the displayed samples, the GUI is updated to highlight the selected sample. In some such examples, highlighting the selected sample includes moving the selected sample from a first location on the GUI to a second location on the GUI. Further, an identifier of the selected sample is obtained as the selection prompt response from the user. This selection prompt response is then used in determining whether the user selection matches the preferred sample at 414.

Figure 5:
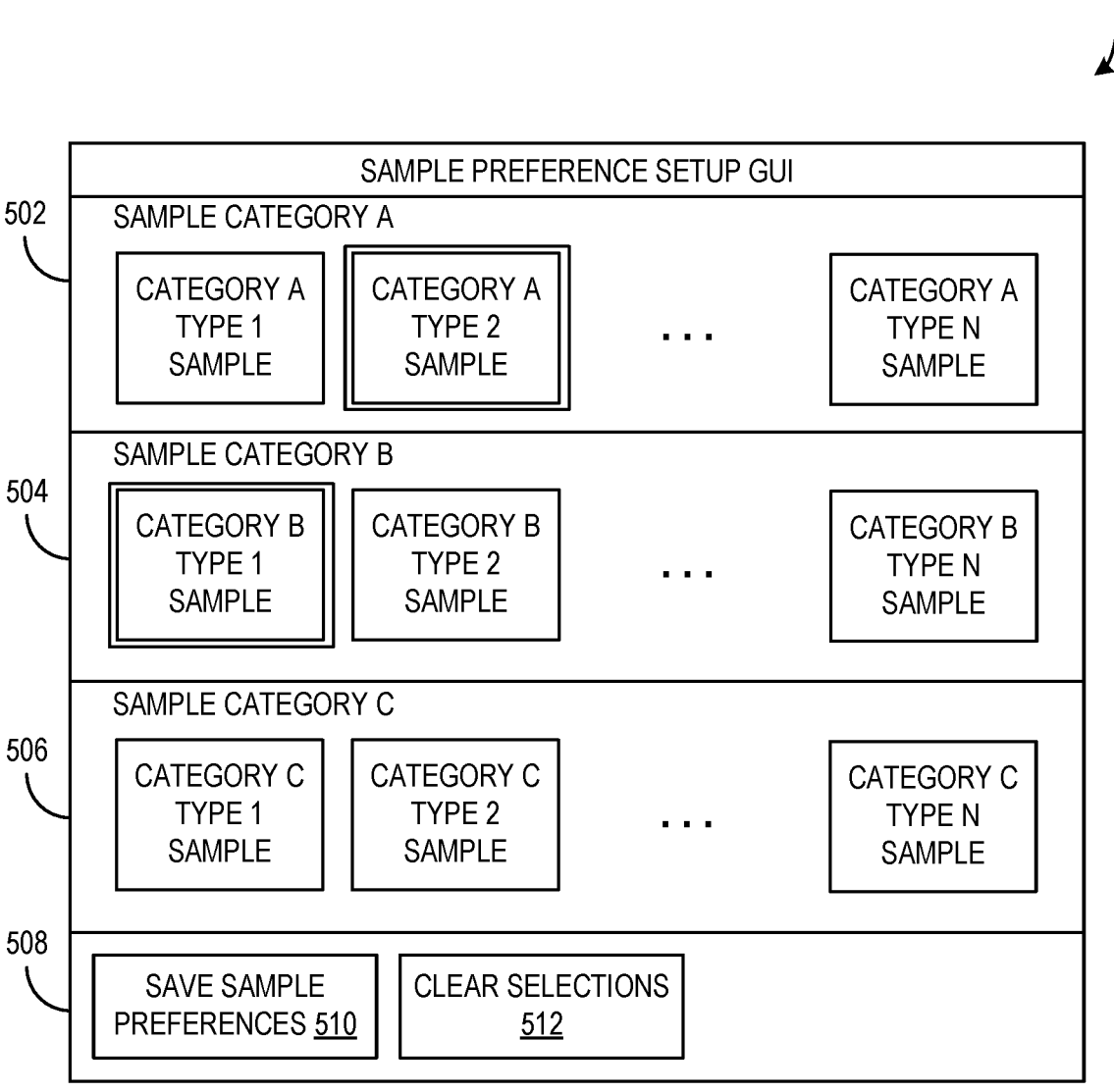
FIG. 5 is a diagram illustrating an example graphical user interface (GUI) for configuring a user's sample preferences.

FIG. 5 is a diagram illustrating a GUI 500 for configuring a user's sample preferences. In some examples, the GUI 500 is executed or otherwise used by a system such as system 100 of FIG. 1 and/or during a method such as methods 200, 300, and/or 400 of FIGS. 2, 3, and/or 4, respectively, without departing from the description.

The sample preference setup GUI 500 includes a section 502 that displays a plurality of samples of a category A. Each of the category A samples 1-N are displayed or otherwise provided to the user of the GUI 500. In some examples, the samples 1-N are images and are displayed in the GUI 500. Alternatively, in some examples, the samples 1-N are audio samples, and the user is enabled to cause the audio samples to play through selection or interaction (e.g., the category A type 2 sample is highlighted as having been selected in the illustration). In other examples, other types of samples, such as video samples that can be played in the same manner as audio samples, are displayed in the section 502 as samples of category A.

The sample preference GUI 500 further includes sections 504 and 506 associated with sample category B and sample category C, respectively. The features of sections 504 and 506 are similar to the features of section 502 as described above, except that the categories of the displayed or otherwise provided samples differ. For instance, in an example, the sample categories A and B are different categories of sample images, while the sample category C includes audio samples. In other examples, more, fewer, or different categories are displayed or otherwise provided by the GUI 500 without departing from the description.

In some examples, a user of the GUI 500 is enabled to select one of the samples in each of the sections 502, 504, and 506. Additionally, or alternatively, in some examples, the GUI 500 includes more and/or different sections for displaying more and/or different categories without departing from the description. As illustrated, the user has selected the category A type 2 sample and the category B type 1 sample. The user has yet to select a category C sample. In some examples, the GUI 500 is configured to require the user to select a sample from all of the provided categories before proceeding. Alternatively, in other examples, the GUI 500 enables the user to select samples from one or more of the provided categories while not selecting samples from some of the provided categories.

The GUI 500 includes a section 508 that includes buttons 510 and 512 configured for controlling the sample preference setup process. The button 510 is configured to save the user's selected sample preferences when pressed or otherwise activated. For instance, in an example where the user activates button 510, the user's preference for the category A type 2 sample and the category B type 1 sample are saved. Further, in some such examples, the GUI 500 is configured to provide identifiers of the selected samples as output of the process (e.g., as user selection data 112 provided to the GAA platform 110). Additionally, or alternatively, activating the button 510 causes the GUI 500 to be removed from the interface on which it is displayed.

The button 512 of section 508 is configured to clear selections. The button enables the user of the GUI 500 to reset the state of the GUI 500 to a point prior to the user making any selections. In this way, if the user changes their mind during the process or realizes that they have made a mistake, they can activate the clear selections button 512 to clear their current selections and start the process over.

In other examples, more, fewer, or different buttons or other controls are included in the GUI 500 without departing from the description.

Figure 6:
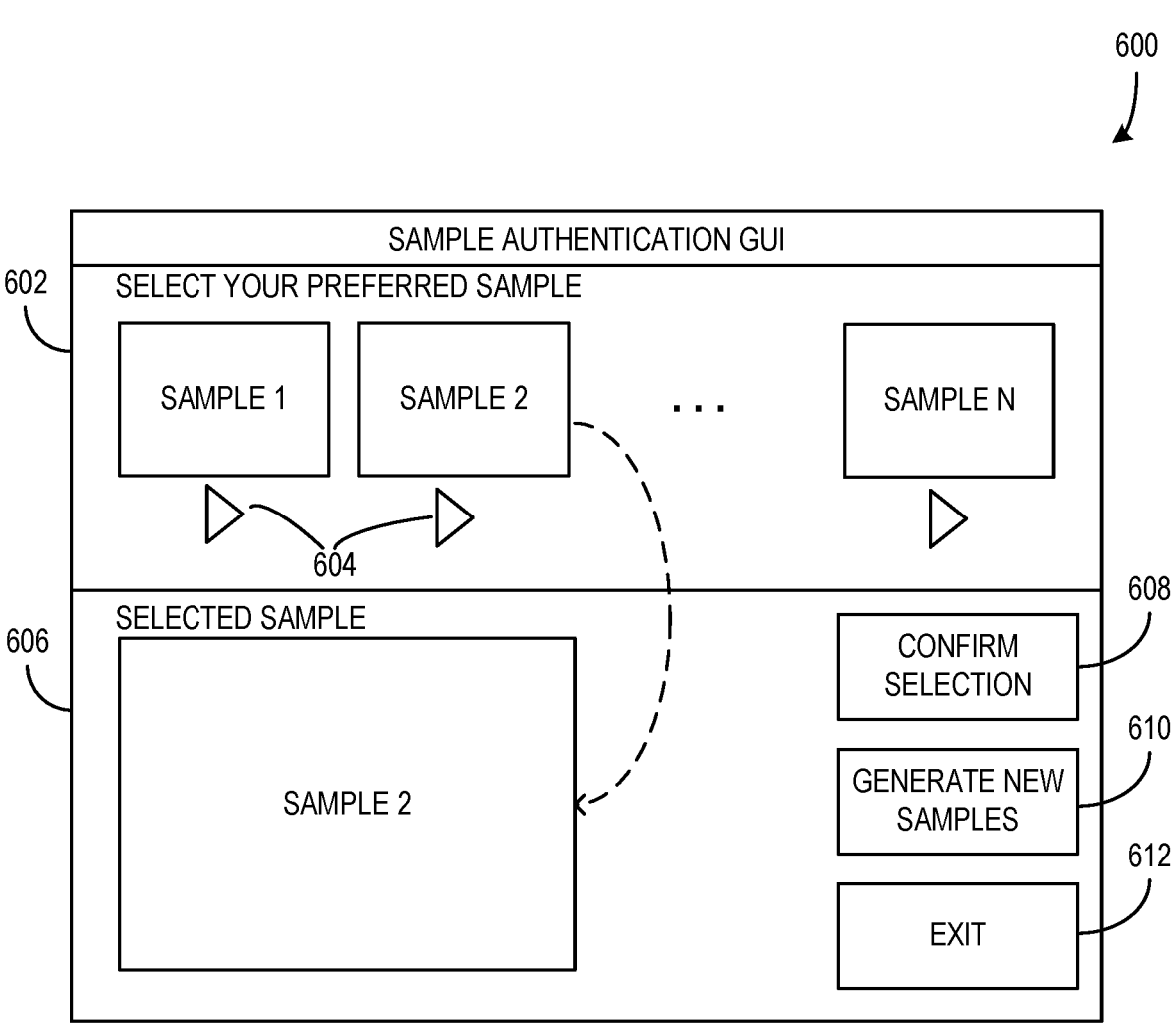
FIG. 6 is a diagram illustrating an example GUI for authenticating a user based on selection of an AI-generated sample.

FIG. 6 is a diagram illustrating a GUI 600 for authenticating a user based on selection of an AI-generated sample. In some examples, the GUI 600 is executed or otherwise used by a system such as system 100 of FIG. 1 and/or during a method such as methods 200, 300, and/or 400 of FIGS. 2, 3, and/or 4, respectively, without departing from the description.

The sample authentication GUI 600 includes a section 602 that displays or otherwise provides a plurality of AI-generated samples (e.g., generated preferred samples 140 and generated random samples 142). Each of the provided samples is generated using a generative AI model (e.g., generative AI model 138) as described herein. Further, each of the provided samples is generated based on the same category or categories of metadata values. At least one of the provided samples is generated based on the previously obtained user selection metadata (e.g., user selection metadata 124) while the remainder of the provided samples are generated based on randomly selected metadata values, wherein the randomly selected metadata values are filtered such that they do not include metadata values in the user selection metadata.

In some examples, the section 602 includes buttons 604 or other similar controls that enable a user to play or otherwise interact with an associated sample, such as in situations where the samples include a playable audio or video component. The illustrated buttons 604 are configured to play an audio portion of a sample when activated, but in other examples, other types of controls are used to interact with the samples in different ways without departing from the description.

The GUI 600 includes a selected sample section 606 that is configured to display a selected sample in a larger or zoomed-in format and/or to play any audio or video component of the sample upon selection. In some examples, a selected sample from section 602 is moved across the GUI upon selection to be displayed in section 606, as illustrated with respect sample 2. The user is enabled to examine the selected sample more closely and/or to observe any playable media component.

Additionally, the section 606 includes buttons 608, 610, and 612. The confirm selection button 608 is configured to confirm the selection of the sample that is currently displayed or presented in section 606. In some examples, by confirming the selection, the GUI 600 disappears, and the authentication process continues as described herein (e.g., the selection is provided to a GAA platform 110 and evaluated therein). The generate new samples button 610 is configured to generate new samples for display in the section 602. In some examples, the user is unable to determine the preferred sample among the samples generated and to avoid selecting incorrectly and failing the authentication process, the user can activate the button 610. In some examples, upon activation, a request for newly generated samples is sent to the GAA platform 110 and the GAA platform 110 generates a new preferred sample and associated random samples in response. Those new samples are then used to populate the section 602, enabling the user to select from the new samples. The exit button 612 is configured to exit the authentication process prior to completion. In some examples, upon activation, the exit button 612 causes the GUI 600 to disappear and the interface returns to a previously displayed GUI without the completion of the authentication process.

Exemplary Operating Environment

Figure 7:
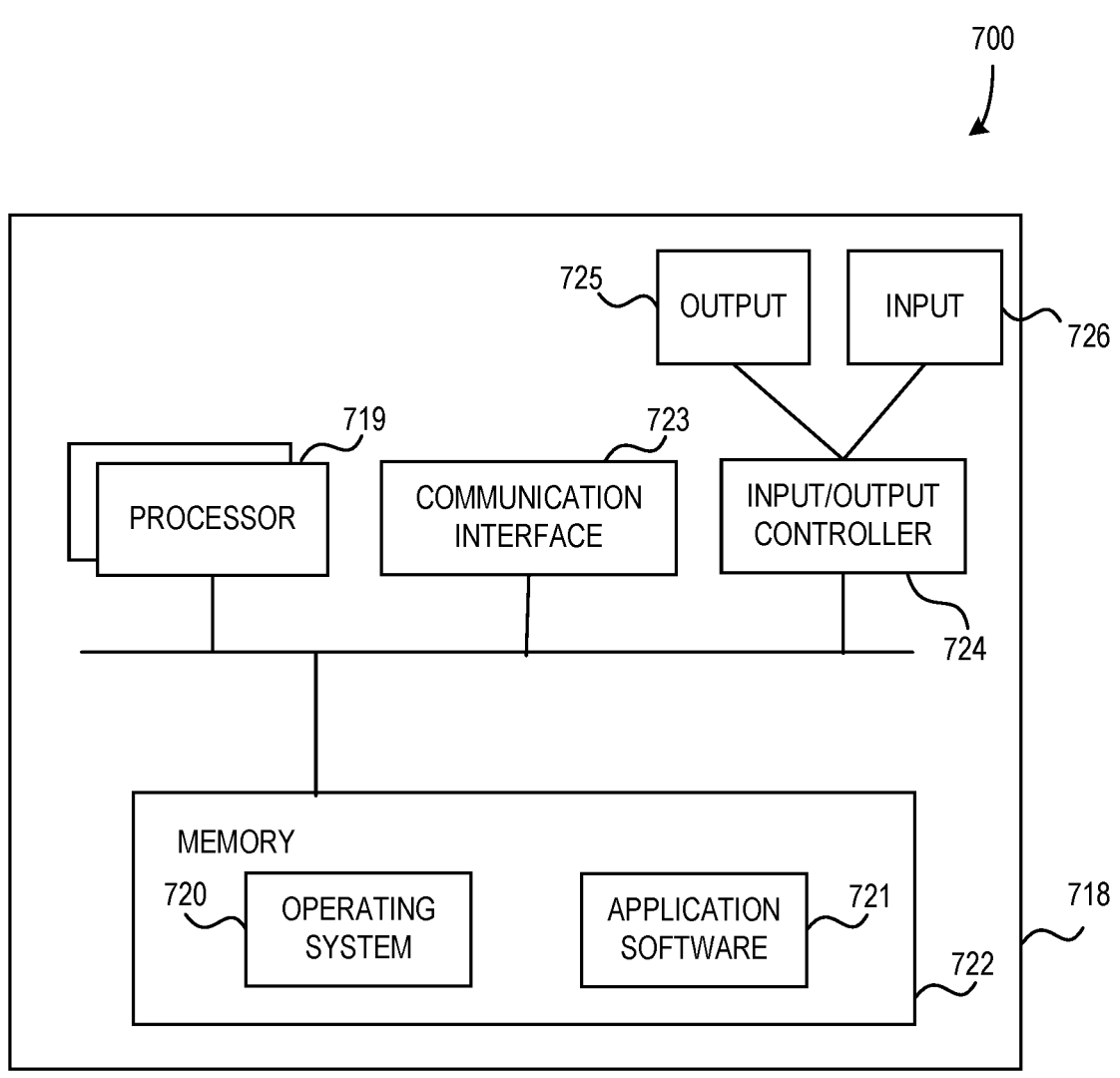
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, authenticating a user using AI-generated media samples as described herein is accomplished by software, hardware, and/or firmware.

In some examples, computer executable instructions are provided using any computer-readable media that is accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: receive a login request from a user; generate a user-preferred sample of the sample category using a generative artificial intelligence (AI) model and a user-preferred sample metadata value; generate one or more random samples using the generative AI model, wherein the one or more random samples are of the sample category; provide the generated user-preferred sample and the generated one or more random samples to the user via an interface; cause the user to be prompted to select a sample from the provided user-preferred sample and provided one or more random samples; determine that a selection prompt response from the user matches the provided user-preferred sample; and grant the login request to the user based on the determined match between the selection prompt response and the provided user-preferred sample.

An example computerized method comprises receiving a login request from a user; generating a user-preferred sample of the sample category using a generative artificial intelligence (AI) model and a user-preferred sample metadata value; generating one or more random samples using the generative AI model, wherein the one or more random samples are of the sample category; providing the generated user-preferred sample and the generated one or more random samples to the user via an interface; causing the user to be prompted to select a sample from the provided user-preferred sample and provided one or more random samples; determining that a selection prompt response from the user matches the provided user-preferred sample; and granting the login request to the user based on the determined match between the selection prompt response and the provided user-preferred sample.

One or more computer storage media having computer-executable instructions that, upon execution by a processor, case the processor to at least receive a login request from a user; generate a user-preferred sample of the sample category using a generative artificial intelligence (AI) model and a user-preferred sample metadata value; generate one or more random samples using the generative AI model, wherein the one or more random samples are of the sample category; provide the generated user-preferred sample and the generated one or more random samples to the user via an interface; cause the user to be prompted to select a sample from the provided user-preferred sample and provided one or more random samples; determine that a selection prompt response from the user matches the provided user-preferred sample; and grant the login request to the user based on the determined match between the selection prompt response and the provided user-preferred sample.

Alternatively, or in addition to the other examples described herein, examples include any combination of the following:

further comprising: registering the user by: providing, to the user, a plurality of samples for each sample category of a plurality of sample categories; prompting the user to select a user-preferred sample from the plurality of samples for each sample category of the plurality of sample categories; and storing metadata associated with user-preferred samples selected by the user in response to the prompting, wherein the stored metadata identifies a sample category and a type value for each selected user-preferred sample.

wherein storing the metadata associated with the user-preferred samples selected by the user in response to the prompting further includes: encrypting the metadata associated with the selected user-preferred samples; and storing the encrypted metadata in associated with a user identifier of the user; wherein generating the user-preferred sample of the sample category using the user-preferred sample metadata value further includes: identifying the stored encrypted metadata based on the association with the user identifier of the user; decrypting the identified encrypted metadata; and obtaining the user-preferred sample metadata value from the decrypted metadata.

wherein generating the user-preferred sample of the sample category using the user-preferred sample metadata value further includes: obtaining a first user-preferred sample metadata value associated with a first sample category; obtaining a second user-preferred sample metadata value associated with a second sample category; and generating a combined sample of the first sample category and the second sample category using the first user-preferred sample metadata value and the second user-preferred sample metadata value.

wherein the first sample category is an image category and the second sample category is an audio category; and wherein the combined sample includes a generated image and a generated audio sample, the generated audio sample being playable by a user in association with observing the generated image.

wherein the first sample category is a first image category and the second sample category is a second image category; and wherein the combined sample includes an image with image content associated with the first image category and image content associated with the second image category.

wherein causing the user to be prompted to select a sample from the provided user-preferred sample and provided one or more random samples further includes: causing the user-preferred sample and the one or more random samples to be displayed on a graphical user interface (GUI); enabling the user to interact with the GUI to select at least one of the user-preferred sample and the one or more random samples; detecting a selection of one of the user-preferred sample and the one or more random samples by the user; updating the GUI to highlight the selected sample of the user-preferred sample and the one or more random samples; and obtaining an identifier of the selected sample as the selection prompt response from the user.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving a login request from a user; exemplary means for generating a user-preferred sample of the sample category using a generative artificial intelligence (AI) model and a user-preferred sample metadata value; exemplary means for generating one or more random samples using the generative AI model, wherein the one or more random samples are of the sample category; exemplary means for providing the generated user-preferred sample and the generated one or more random samples to the user via an interface; exemplary means for causing the user to be prompted to select a sample from the provided user-preferred sample and provided one or more random samples; exemplary means for determining that a selection prompt response from the user matches the provided user-preferred sample; and exemplary means for granting the login request to the user based on the determined match between the selection prompt response and the provided user-preferred sample.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for authenticating login requests, the system comprising:
   a processor; and
   a memory comprising computer program code, the memory and the computer program code configured to cause the processor to:
   receive a login request from a user;
   use a generative artificial intelligence (AI) model to generate a user-preferred sample of a sample category based on a user-preferred sample metadata value;
   use the generative AI model to generate one or more random samples that are not based on the user-preferred sample metadata value, wherein the one or more random samples are of the sample category;
   provide the generated user-preferred sample and the generated one or more random samples to the user via an interface;
   cause the user to be prompted to select a sample from the provided user-preferred sample and provided one or more random samples;
   determine that a selection prompt response from the user matches the provided user-preferred sample; and
   grant the login request to the user based on the determined match between the selection prompt response and the provided user-preferred sample.

2. The system of claim 1, wherein the computer program code is configured to further cause the processor to:
   register the user by:
   providing, to the user, a plurality of samples for each sample category of a plurality of sample categories;
   prompting the user to select a user-preferred sample from the plurality of samples for each sample category of the plurality of sample categories; and
   storing metadata associated with user-preferred samples selected by the user in response to the prompting, wherein the stored metadata identifies a sample category and a type value for each selected user-preferred sample.

3. The system of claim 2, wherein storing the metadata associated with the user-preferred samples selected by the user in response to the prompting further includes:
   encrypting the metadata associated with the selected user-preferred samples; and
   storing the encrypted metadata in associated with a user identifier of the user;
   wherein generating the user-preferred sample of the sample category using the user-preferred sample metadata value further includes:
   identifying the stored encrypted metadata based on the association with the user identifier of the user;
   decrypting the identified encrypted metadata; and
   obtaining the user-preferred sample metadata value from the decrypted metadata.

4. The system of claim 1, wherein generating the user-preferred sample of the sample category using the user-preferred sample metadata value further includes:
   obtaining a first user-preferred sample metadata value associated with a first sample category;
   obtaining a second user-preferred sample metadata value associated with a second sample category; and
   generating a combined sample of the first sample category and the second sample category using the first user-preferred sample metadata value and the second user-preferred sample metadata value.

5. The system of claim 4, wherein the first sample category is an image category and the second sample category is an audio category; and wherein the combined sample includes a generated image and a generated audio sample, the generated audio sample being playable by a user in association with observing the generated image.

6. The system of claim 4, wherein the first sample category is a first image category and the second sample category is a second image category; and wherein the combined sample includes an image with image content associated with the first image category and image content associated with the second image category.

7. The system of claim 1, wherein causing the user to be prompted to select a sample from the provided user-preferred sample and provided one or more random samples further includes:

causing the user-preferred sample and the one or more random samples to be displayed on a graphical user interface (GUI);

enabling the user to interact with the GUI to select at least one of the user-preferred sample and the one or more random samples;

detecting a selection of one of the user-preferred sample and the one or more random samples by the user;

updating the GUI to highlight the selected sample of the user-preferred sample and the one or more random samples; and obtaining an identifier of the selected sample as the selection prompt response from the user.

8. A computerized method for authenticating login requests, the method comprising:

receiving a login request from a user;

using a generative artificial intelligence (AI) model to generate a user-preferred sample of a sample category based on a user-preferred sample metadata value;

using the generative AI model to generate one or more random samples that are not based on the user-preferred sample metadata value, wherein the one or more random samples are of the sample category;

providing the generated user-preferred sample and the generated one or more random samples to the user via an interface;

causing the user to be prompted to select a sample from the provided user-preferred sample and provided one or more random samples;

determining that a selection prompt response from the user matches the provided user-preferred sample; and granting the login request to the user based on the determined match between the selection prompt response and the provided user-preferred sample.

9. The computerized method of claim 8, further comprising:

registering the user by:

providing, to the user, a plurality of samples for each sample category of a plurality of sample categories;

prompting the user to select a user-preferred sample from the plurality of samples for each sample category of the plurality of sample categories; and storing metadata associated with user-preferred samples selected by the user in response to the prompting, wherein the stored metadata identifies a sample category and a type value for each selected user-preferred sample.

10. The computerized method of claim 9, wherein storing the metadata associated with the user-preferred samples selected by the user in response to the prompting further includes:

encrypting the metadata associated with the selected user-preferred samples; and storing the encrypted metadata in associated with a user identifier of the user;

wherein generating the user-preferred sample of the sample category using the user-preferred sample metadata value further includes:

identifying the stored encrypted metadata based on the association with the user identifier of the user;

decrypting the identified encrypted metadata; and obtaining the user-preferred sample metadata value from the decrypted metadata.

11. The computerized method of claim 8, wherein generating the user-preferred sample of the sample category using the user-preferred sample metadata value further includes:

obtaining a first user-preferred sample metadata value associated with a first sample category;

obtaining a second user-preferred sample metadata value associated with a second sample category; and generating a combined sample of the first sample category and the second sample category using the first user-preferred sample metadata value and the second user-preferred sample metadata value.

12. The computerized method of claim 11, wherein the first sample category is an image category and the second sample category is an audio category; and wherein the combined sample includes a generated image and a generated audio sample, the generated audio sample being playable by a user in association with observing the generated image.

13. The computerized method of claim 11, wherein the first sample category is a first image category and the second sample category is a second image category; and wherein the combined sample includes an image with image content associated with the first image category and image content associated with the second image category.

14. The computerized method of claim 8, wherein causing the user to be prompted to select a sample from the provided user-preferred sample and provided one or more random samples further includes:

causing the user-preferred sample and the one or more random samples to be displayed on a graphical user interface (GUI);

enabling the user to interact with the GUI to select at least one of the user-preferred sample and the one or more random samples;

detecting a selection of one of the user-preferred sample and the one or more random samples by the user;

updating the GUI to highlight the selected sample of the user-preferred sample and the one or more random samples; and obtaining an identifier of the selected sample as the selection prompt response from the user.

15. A computer storage medium having computer-executable instructions that, upon execution by a processor, cause the processor to authenticate login requests by at least:

receiving a login request from a user;

using a generative artificial intelligence (AI) model to generate a user-preferred sample of a sample category based on a user-preferred sample metadata value;

using the generative AI model to generate one or more random samples that are not based on the user-preferred sample metadata value, wherein the one or more random samples are of the sample category;

providing the generated user-preferred sample and the generated one or more random samples to the user via an interface;

causing the user to be prompted to select a sample from the provided user-preferred sample and provided one or more random samples;

determining that a selection prompt response from the user matches the provided user-preferred sample; and granting the login request to the user based on the determined match between the selection prompt response and the provided user-preferred sample.

16. The computer storage medium of claim 15, wherein the computer-executable instructions, upon execution by a processor, further cause the processor to at least:

register the user by:

providing, to the user, a plurality of samples for each sample category of a plurality of sample categories;

prompting the user to select a user-preferred sample from the plurality of samples for each sample category of the plurality of sample categories; and storing metadata associated with user-preferred samples selected by the user in response to the prompting, wherein the stored metadata identifies a sample category and a type value for each selected user-preferred sample.

17. The computer storage medium of claim 15, wherein generating the one or more random samples using the generative AI model includes:

generating text prompts based on metadata values using a Large Language Model (LLM); and generating the one or more random samples using the generative AI model and the generated text prompts, wherein the generated text prompts are used as input to the generative AI model.

18. The computer storage medium of claim 15, wherein obtaining the user-preferred sample metadata value associated with the user, wherein the user-preferred sample metadata value is associated with a sample category further includes:

obtaining a first user-preferred sample metadata value associated with a first sample category;

obtaining a second user-preferred sample metadata value associated with a second sample category; and generating a combined sample of the first sample category and the second sample category using the first user-preferred sample metadata value and the second user-preferred sample metadata value.

19. The computer storage medium of claim 18, wherein the first sample category is an image category and the second sample category is an audio category; and wherein the combined sample includes a generated image and a generated audio sample, the generated audio sample being playable by a user in association with observing the generated image.

20. The computer storage medium of claim 15, wherein causing the user to be prompted to select a sample from the provided user-preferred sample and provided one or more random samples further includes:

causing the user-preferred sample and the one or more random samples to be displayed on a graphical user interface (GUI);

enabling the user to interact with the GUI to select at least one of the user-preferred sample and the one or more random samples;

detecting a selection of one of the user-preferred sample and the one or more random samples by the user;

updating the GUI to highlight the selected sample of the user-preferred sample and the one or more random samples; and obtaining an identifier of the selected sample as the selection prompt response from the user.

* * * * *